UNITED STATES PATENT OFFICE.

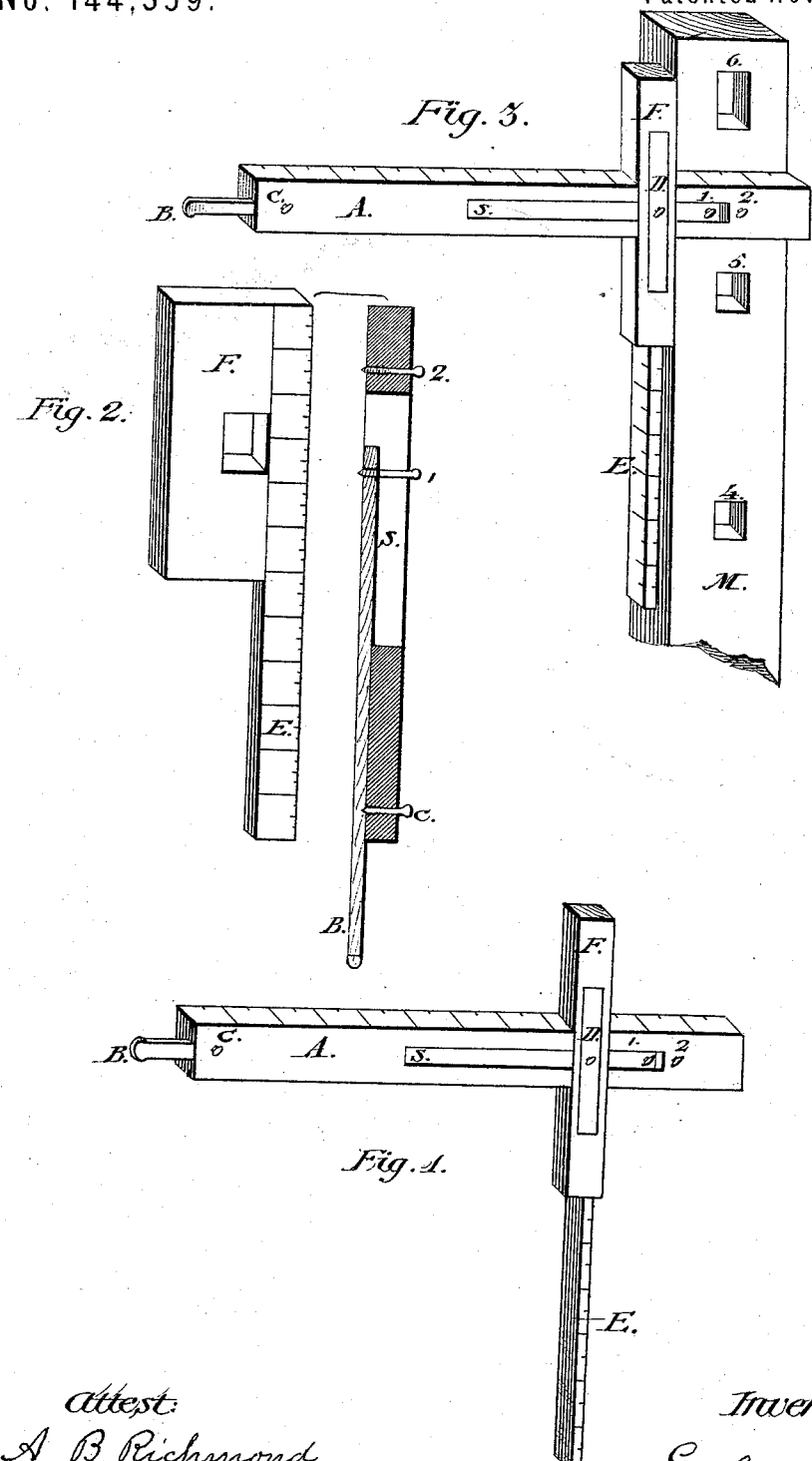

ELIAS SAHM, OF GREENVILLE, PENNSYLVANIA.

IMPROVEMENT IN CARPENTERS' GAGES.

Specification forming part of Letters Patent No. 144,359, dated November 4, 1873; application filed April 29, 1873.

*To all whom it may concern:*

Be it known that I, ELIAS SAHM, of Greenville, in the county of Mercer, State of Pennsylvania, have invented a new and Improved Combined Square and Gage for carpenters' use; and I do hereby declare that the following is a full and exact description of the same, reference being had to the accompanying drawings and the letters of reference marked thereon.

The object of my invention is to construct an instrument to be used in laying out frames of buildings, combining a carpenter's square and gage; that the distance between mortises or gains may be rapidly laid out, and also the width of the mortises or gains gaged and marked on the timber.

Figure 1 represents my instrument adjusted in working order.

A is the gage-arm, and on the face side is laid off in inches and the fractions thereof, like a common carpenter's rule. B is a metal sliding rod, running nearly the whole length of A, as better shown in Fig. 2. In one end of this rod is the marking-point 1, which passes through B with a screw. 2 is another (stationary) marking-point, which passes through A, near the end thereof. S is a slot, through which the marking-point 1 passes when moved by B. C is a set-screw, by which the slide B, with the point 1, is adjusted and held securely at any desired distance from the point 2. F is a gage-head with an arm, E, projecting therefrom, as shown in the drawing. This arm E is also marked off in inches, similar to A. D is a set-screw, which fastens or sets the gage-head F securely at any desired point on A.

Fig. 2 shows the instrument with the gage-head separated from the arm A, showing a sectional view of A. Fig. 3 shows the manner of using the instrument, M representing a stick of timber, and 4 5 6 mortises.

It will be seen from the position of the instrument that the distance between the mortises can easily be measured off by E and their width laid out by the two points 1 and 2. A carpenter, in laying out a stick of timber, commences at one end thereof, places the instrument in the position shown at Fig. 3, and moves forward, measuring the distances between the mortises and gaging their width with great rapidity. To accomplish the same labor with the common square and scratch-awl of the carpenter requires a number of motions—that is, the square must be taken up and its position changed a number of times in marking one mortise.

This instrument can be used in any place where a common square can be used, and with it the work be done much more rapidly and accurately.

What I claim as my invention is as follows, to wit:

The graduated arm A, in combination with the points 1 and 2 and the sliding rod B, the head F, and the graduated arm E, constructed as described, for the purposes set forth.

ELIAS SAHM.

Witnesses:
   A. B. RICHMOND,
   ROE REISINGER.